United States Patent [19]

Thönes et al.

[11] Patent Number: 4,755,232
[45] Date of Patent: Jul. 5, 1988

[54] METHOD AND APPARATUS FOR MECHANICALLY CONTROLLING THE FLAME CUTTING AND/OR CONNECTION WELDING OF WORKPIECES

[75] Inventors: Gustav Thönes; Paul Roll, both of Gummersbach, Fed. Rep. of Germany

[73] Assignee: L. & C. Steinmüller GmbH, Gummersbach, Fed. Rep. of Germany

[21] Appl. No.: 825,809

[22] Filed: Feb. 4, 1986

[30] Foreign Application Priority Data

Feb. 4, 1985 [DE] Fed. Rep. of Germany ....... 3503675

[51] Int. Cl.⁴ ............................ B23K 7/04; B23K 7/10
[52] U.S. Cl. ..................................... 148/9 R; 266/54; 266/60; 266/61
[58] Field of Search .................. 266/60, 61, 54; 148/9

[56] References Cited

U.S. PATENT DOCUMENTS

| 2,154,974 | 4/1939 | Cook | 266/60 |
| 2,172,313 | 9/1939 | Young | 266/60 |
| 4,148,467 | 4/1979 | Sargeant | 266/61 |
| 4,219,370 | 8/1980 | Hoaglin et al. | 266/61 |

Primary Examiner—Wayland Stallard
Attorney, Agent, or Firm—Becker & Becker, Inc.

[57] ABSTRACT

A method and apparatus for mechanically controlling the flame cutting and/or connection welding of workpieces. The difficulty encountered during the mechanized burning of holes in vessels, containers or tanks and the welding of connecting members into these holes is that the cutting and welding apparatus need to be guided in such a way that not only do they not contact the surface of the vessel, container or tank, but they are also kept a fixed distance from this surface. Therefore, control of the cutting and/or welding process is effected in conformity with the actual dimensions of the workpiece that is being worked on. In particular, this control is undertaken in conformity with the circumferential line of the hole for a given connecting member, and also in conformity with the curved surface of the vessel, container or tank. The peripheral line of the connecting member is first sensed and is graphically or electromagnetically recorded. The subsequent control of the cutting and/or welding process is then effected by following this recorded line.

16 Claims, 1 Drawing Sheet

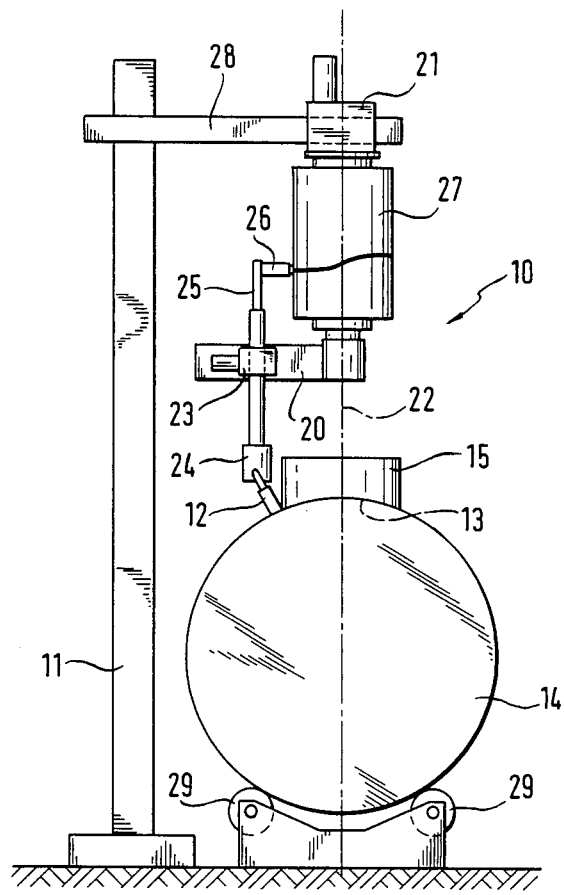

METHOD AND APPARATUS FOR MECHANICALLY CONTROLLING THE FLAME CUTTING AND/OR CONNECTION WELDING OF WORKPIECES

BACKGROUND OF THE INVENTION

1. Field of the Invention

The present invention relates to a method and an apparatus for mechanically controlling the flame cutting and/or connection welding of workpieces, especially the burning or cutting-out of holes in vessels, containers or tanks for connecting members, and the welding of such connecting members into these holes.

2. Description of the Prior Art

Heretofore known apparatus for flame cutting and welding generally utilize cams, guide means, or the like for a mechanical control. All of these apparatus effect control based on the theoretical dimensions of the workpiece that is being worked on. The drawback to this is that the differences that exist between the actual and the theoretical curvature of the vessel, container or tank due to tolerances and unevenness are not taken into consideration, thus resulting in errors during the cutting and welding procedures. Furthermore, adjustment of the heretofore known mechanical control devices is very complicated and time consuming.

An object of the present invention is to provide a method, and an apparatus for carrying out such a method, whereby the drawbacks encountered by the heretofore known apparatus are avoided. Furthermore, the control procedure for the cutting and/or welding process should be effected without contacting the surface of the vessel, container or tank, and the control mechanism should be at a constant distance from the latter.

BRIEF DESCRIPTION OF THE DRAWING

These objects, and other objects and advantages of the present invention, will appear more clearly from the following specification in conjunction with the accompanying schematic drawing of one exemplary embodiment of the inventive apparatus for carrying out the method of the present invention.

SUMMARY OF THE INVENTION

The method of the present invention is characterized primarily by effecting control of the cutting and/or welding process in conformity with the actual dimensions of the workpiece that is being worked on, and in particular in conformity with the circumferential line of the hole for the connecting member, as well as in conformity with the curved surface of the tank. In this way, the control process is determined by the actual geometry of the workpiece. This advantageously results in a precise conforming to the dimensions of the workpiece, so that no machining is required after the flame cutting or welding.

Pursuant to one advantageous further embodiment of the present invention, the peripheral line of the connecting member is first recorded, and is subsequently followed for effecting the control of the cutting and/or welding process. The peripheral line of the connecting member can be recorded graphically, and control can be effected photoelectrically. Involved is a recording-reading process that has been tested and proven in a number of areas. This process is commercially available and therefore economical.

It is also advantageously possible to electromagnetically record the peripheral line of the connecting member, and to effect the control process via a suitable electromagnetic reading element. In this case also a proven and particularly reliable technique can be relied upon.

Pursuant to a further embodiment of the present invention, it is also possible to manually record the peripheral line of the connecting member. This procedure has turned out to be particularly expedient since on the one hand it is very easy to implement and therefore is economical, and on the other hand also permits a visual examination of the workpiece in one of the stages.

Pursuant to one especially preferred apparatus for carrying out the method of the present invention, a control unit is provided that is horizontally and vertically displaceably mounted on a support, with the control unit including a carrier for receiving the cutting and/or welding apparatus, or a sensing device.

Pursuant to a further embodiment of the inventive apparatus, the control unit may be provided with a lever arm that is rotated about the central axis of the connecting member via a drive motor and gear unit, the rotational speed of which is regulated; disposed on the lever arm is a drive and guide mechanism for the carrier.

Pursuant to a further embodiment of the control unit, an attachment device for a recording and/or reading element is mounted on the upper end of the carrier. In addition, the control unit is furthermore provided with a drum or cylinder that is fixedly connected with the support arm, is non-rotatable relative to the lever arm, and is covered with a thin sheet for recording purposes. Expediently installed in the attachment device, as a recording element, there is provided a recording pen, and, as a reading element, there is provided a photocell. A sensing roller can be placed in the carrier as the sensing device. It would also be just as advantageous to place an electromagnetic recording/reading head in the attachment device as the recording and reading element. In this case, an appropriate electronic transmitter could be used as the sensing device in the carrier.

Further advantageous features of the present invention will be described in detail subsequently.

DESCRIPTION OF PREFERRED EMBODIMENTS

Referring now to the drawing in detail, the illustrated control unit 10 is horizontally and vertically displaceably mounted on a stand or support 11. A torch and/or welding apparatus 12, or even a grinder, is supported and moved in a prescribed manner by the control unit 10. The control unit 10 comprises a lever arm 20 that is rotated about the central axis 22 of the connecting member 15 via a drive motor and gear unit 21, the rotational speed of which is regulated. Disposed on the lever arm 20 is the drive and guide mechanism 23 of the carrier 24 for the apparatus 12. The distance of the carrier 24 relative to the surface of the vessel, container or tank 14 in the region of the hole 13 for the connecting member 15 is kept constant during the entire time that the lever arm 20 rotates.

To use the control unit 10, the central axis 22 of the connecting member 15 is first marked on the tank 14. The control unit 10, which is mounted on the portable support 12, is then centered on the central axis 22 of the connecting member 15 in a suitable manner. With the drive and adjusting motors 21 and 23 disengaged, a non-illustrated sensing roller, which is mounted in the carrier 24 in place of the torch and/or welding apparatus 12, can mannually follow the contour of the vessel, container or tank 14 along the circumferential circle of the connecting member 15 that is later to be welded in in the region of the hole 13. Disposed at the upper end 25 of the carrier 24 is an attachment device 26 for a recording pen or for receiving some other type of recording element. The control unit 10 is further provided with a drum or cylinder 27 that is rigidly connected to the support arm 28 and does not rotate along with the lever arm 20. Fixed on the cylinder 27 is a sheet upon which the peripheral circle or line of the hole 13 for the connecting member 15 is graphically or electromagnetically recorded in conformity with the curvature of the vessel, container or tank 14.

In order to burn or cut the hole 13 for the connecting member 15 out of the vessel, container or tank 14, a non-illustrated photocell or an electromagnetic reader head can be installed in the attachment device 26 in place of the recording element. The carrier 24 is then provided with a flame or acetylene cutter 12. The desired cutting speed is achieved by appropriate adjustment of the speed of the drive unit 21. The recording and/or reading element mounted in the attachment device 26 controls the drive mechanism 23 of the carrier 24 for the apparatus 12 and, by travelling along the line previously recorded on the cylinder 27, keeps the distance between the vessel, container or tank 14 and the flame cutter 12 constant. After the hole 13 for the connecting member 15 has been cut out and ground, the connecting member 15 can be placed or tacked into the hole 13. To weld the connecting member 15 to the vessel, container or tank 14 in the region of the opening 13, a welding head, such as a submerged arc welding head, is placed in the carrier 24. As in the manner described in connection with the flame cutting, the desired welding speed is set at the drive unit 21. After the connecting member 15 has been welded into the hole 13, the connecting member 15 can be cutoff on the inside of the vessel, container or tank 14 in the vicinity of the hole 13 is conformity with the curve that is recorded on the cylinder 27.

It should be noted that the inventive features are not limited to the embodiment illustrated in the drawing, for example, it is possible to utilize the apparatus not only for flame cutting and/or welding in a vertical position as illustrated, bu also in a horizontal position. This can be accomplished, on the one hand, by turning the vessel, container or tank 14 that is rotatably supported on rollers 29. On the other hand, however, it would also be possible to pivotably mount the support 11 so that is could pivot to a certain extent, such as up to 90°. It is within the scope of the present invention to utilize the apparatus for flame cutting and welding other workpieces that pose problems similar to those initially discussed.

The present invention is, of course, in no way restricted to the specific disclosure of the specification and drawing, but also encompasses any modifications within the scope of the appended claims.

What we claim is:

1. A method for controlled flame-cutting burning-out of a hole of a workpiece with a curved surface and a welding-in of a cylindrical second workpiece into the hole, with which during the flame cutting out respectively welding, the required tool is pivoted about an axis of the second workpiece and is moved corresponding to a circumferential line of the second workpiece parallel to the axis of the second workpiece, especially for flame cutting-out of connecting-member holes, in vessels, containers, tanks and the like, for connecting members, and the welding-in of connecting members into the connecting-member holes; said method comprising the steps of:

sensing the contour of said first workpiece upon the circumferential line of the second workpiece before the burning-out upon the surface of the first workpiece, said sensing of the circumferential line serving for additionally controlling movement of a tool parallel to an axis of the second workpiece, and recording data of the sensed contour upon a recording carrier, said recording of data occurring due to sensing during flame cutting out as well as welding.

2. A method according to claim 1, which comprises the steps of recording said circumferential line of the second workpiece upon the recording carrier graphically, and following said line photoelectrically.

3. A method according to claim 1, which comprises the steps of recording said circumferential line of the second workpiece electromagnetically upon the recording carrier, and effecting control of the tool by following said line with suitable electromagnetic reading elements.

4. A method for controlled flame-cutting burning-out of a hole of a workpiece with a curved surface and a welding-in of a cylindrical second workpiece into the hole, with which during the flame cutting out respectively welding, the required tool is pivoted about an axis of the second workpiece and is moved corresponding to a circumferential line of the second workpiece parallel to the axis of the second workpiece, especially for flame cutting out of connecting-member holes in containers, vessel, tanks and the like and welding-in of connecting members into the connecting-member holes, said method comprising the steps of:

sensing the circumferential line of the second workpiece before the burning-out upon the surface of the first workpiece, said sensing of the circumferential line serving for additionally controlling movement of a tool parallel to an axis of the connecting member, said sensing of the circumferential line occurring upon a recording carrier and said recording of data occurring due to sensing during flame cutting out as well as welding.

5. A method according to claim 4 comprising steps of recording said circumferential line of the second workpiece upon a recording carrier graphically, and following said line photoelectrically.

6. A method according to claim 4 comprising the steps of recording the circumferential line of the second workpiece upon an electromagnetic recording carrier and carrying out said controlling via suitable electromagnetic reading elements.

7. An apparatus for mechanically controlling the flame cutting and/or connection welding of workpieces, especially the cutting-out of holes, in tanks, for connecting members, and the welding of connecting members into these holes; said apparatus comprises:

a support; and a control unit that is horizontally and vertically displaceably mounted on said support, with said control unit including a carrier for selectively receiving a cutting apparatus, a welding apparatus, and a sensing device.

8. An apparatus according to claim 7, in which each of said connecting members has a central axis; in which said control unit further includes a lever arm and a drive motor and gear unit for rotating said lever arm about the central axis of a given one of said connecting members, with the rotational speed of said drive motor and gear unit being regulated; and which includes, mounted on said lever arm, a drive and guide mechanism for said carrier.

9. An appartus according to claim 8, in which said support includes a support arm; in which said control unit further includes a cylinder that is fixedly secured to said support arm, is nonrotatable relative to said lever arm, and is covered with a sheet for receiving a recording; and in which said carrier has an end, remote from said tank, on which is disposed an attachment device for receiving a recording and/or reading element.

10. An apparatus according to claim 9, in which, disposed in said attachment device, is a recording pen as a recording element, and a photocell as a reading element; and in which a sensing roller is disposed in said carrier as a sensing device.

11. An apparatus according to claim 9, in which an electromagnetic recording/reading head is disposed in said attachment device as a recording and reading element; and in which a corresponding electronic transmitter is disposed in said carrier as a sensing device.

12. An apparatus for controlled flame cutting out of a hole in a workpiece with a curved surface and welding of a cylindrical second workpiece into the hole, with which during the flame cutting out respectively welding the required tool is pivoted about the axis of the second workpiece and is moved corresponding to the circumferential line of the second workpiece parallel to the axis of the second workpiece, especially for flame cutting out of connecting-member holes in containers, vessels, tanks and the like and welding-in of connecting members into connecting-member holes, comprising, a control unit arranged horizontally and vertically shiftable on a carrier, said control device being connectable with an apparatus carrier for receiving a burning- respectively welding device as well as a sensing element connected therewith.

13. An apparatus according to claim 12 wherein said control unit comprises a lever arm which is rotated via a speed regulated drive motor and transmission to turn around an axis aligned upon the center of a support, whereby a drive and adjusting motor means is arranged upon said lever arm.

14. An apparatus according to claim 13 wherein in an upper end of said carrier there is arranged an attachment device for a recording pen respectively reading element and whereby the control unit includes a cylinder covered with a foil and fixed against rotation relative to said lever arm, said cylinder being rigidly connected with a support arm.

15. An apparatus according to claim 14 wherein a pen is employed in said attachment device as a recording element and a photocell is employed as a reading element, whereby a sensing roller is employed as a sensing element in said carrier.

16. An apparatus according to claim 14 wherein an electromagnetic recording-/reading head is installed in said attachment device as a recording- and reading element, whereby a corresponding electronic emitter is employed as a sensing element in said carrier.

* * * * *